(12) United States Patent
Jallot et al.

(10) Patent No.: US 6,679,447 B2
(45) Date of Patent: Jan. 20, 2004

(54) SEAT BELT RETRACTOR

(75) Inventors: Frederic Jallot, London (GB); John Foster Bell, Carlisle (GB); Michael Thwaites, Tyne and Wear (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/197,649

(22) Filed: Jul. 18, 2002

(65) Prior Publication Data

US 2002/0179765 A1 Dec. 5, 2002

Related U.S. Application Data

(62) Division of application No. 09/521,150, filed on Mar. 8, 2000, now abandoned.

(30) Foreign Application Priority Data

Mar. 11, 1999 (GB) .............................................. 9905564

(51) Int. Cl.[7] .............................................. B60R 22/36
(52) U.S. Cl. ...................... 242/384.4; 280/806; 280/807
(58) Field of Search ....................... 242/384.4; 280/806, 280/807; 297/476, 478

(56) References Cited

U.S. PATENT DOCUMENTS

| 4,136,841 A | | 1/1979 | Fohl ............................ 242/107 |
| 4,645,138 A | * | 2/1987 | Kapanka .................. 242/384.4 |
| 4,767,078 A | | 8/1988 | Fohl ........................ 242/107.4 |
| 5,161,748 A | | 11/1992 | Iguchi et al. ................ 242/107 |

FOREIGN PATENT DOCUMENTS

| GB | 1561639 | | 2/1980 |
| GB | 2113529 | * | 8/1983 |

* cited by examiner

*Primary Examiner*—John Q. Nguyen
(74) *Attorney, Agent, or Firm*—Jarett Rieger; Lonnie Drayer

(57) ABSTRACT

A seat belt retractor has a housing and a spool in the housing. A toothed ratchet wheel is coupled to the spool. A locking assembly has a lock bar pivotally mounted to the housing and moveable by means of a camming arrangement from an initial position clear of the ratchet wheel to a position whereby the lock bar locks the ratchet wheel to the housing. An adjustment mechanism enables adjustment of the initial position of the lock bar.

5 Claims, 7 Drawing Sheets

SEAT BELT RETRACTOR

The present application is a divisional of U.S. patent application Ser. No. 09/521,150 filed on Mar. 8, 2000 now abandoned.

FIELD OF THE INVENTION

The invention relates to a seat belt retractor, particularly to a retractor having the spool of the retractor locked by a lock bar engaging a ratchet wheel on a spool.

BACKGROUND OF THE INVENTION

Some known seat belt retractors are able to lock the spool around which the seat belt is wound to prevent the spool paying out in the event of a crash. One such retractor has a spool with a toothed ratchet wheel fixed to on one end of the spool. A "lock bar" is designed to pivot between a position clear of the ratchet wheel and an engagement position in which the tip of the "lock bar" engages the teeth of the ratchet. The "lock bar" is fixed to the retractor housing and engagement of the "lock bar" with the ratchet locks the spool to the housing to prevent further pay out of the belt.

The gap between the "lock bar" and the ratchet is a critical distance that needs to be tightly controlled. It was previously necessary to use very tightly toleranced parts to reduce the possibility of dimension errors being introduced whereby the initial position of the "lock bar" is compromised. The use of such tightly toleranced parts substantially increases the cost of the retractor. Positioning the "lock bar" too close to the ratchet wheel will result in erroneous and excessively frequent engagement of the "lock bar" with the ratchet wheel. Positioning the "lock bar" too far away from the ratchet wheel will increase the time required to initiate engagement of the "lock bar" with the ratchet wheel allowing further payout of the belt prior to locking. Moreover, an "early" engagement will result in the lock bar hitting the back of the "previous" ratchet tooth. That can lead to the lock bar bouncing out of engagement with the wheel and thus not able to ensure locking of the wheel. That can also lead to jamming of the whole mechanism leading to the permanent locked state of the retractor.

A "late" engagement can make the lock bar hit the ratchet at a point where the dimension of the tooth is not big enough to take the load applied by the webbing on the retractor, possibly leading to breakage of the tooth.

SUMMARY OF THE INVENTION

In accordance with the invention there is provided a seat belt retractor comprising a retractor housing, a spool in the housing, a toothed ratchet wheel coupled to the spool, a locking assembly for locking the ratchet wheel to the housing comprising a lock bar moveable from an initial position to a ratchet wheel locking position whereby the lock bar engages the ratchet wheel to lock the wheel to the housing and an adjustment mechanism enabling adjustment of the initial position of the lock bar.

The components required to make the new seat belt retractor can be engineered with a larger tolerance and the initial position of the lock bar adjusted on assembly of the retractor. Because the initial position of the lock bar can be finely controlled by the adjustment mechanism the number of teeth on the ratchet wheel can be increased which further reduces the amount of seat belt pay out before and thus improves the coupling between a vehicle occupant and the seat belt system in the vehicle.

Preferably the lock bar is moved into the ratchet wheel locking position by means of the rotation of the spool.

Most preferably, the locking assembly comprises a lockcup movably mounted to the retractor housing, the lockcup including a cam surface and the lock bar includes a cam follower whereby movement of the lockcup causes the cam follower to move along the cam surface so as to move the lock bar from the initial position to the ratchet wheel locking position. The cam surface preferably comprises a slot in the lockcup.

The adjustment mechanism preferably comprises means for converting rotational displacement into translational displacement.

The adjustment mechanism is preferably received in the slot in the lockcup. In a preferred embodiment the cam follower of the lock bar comprises the adjustment mechanism.

In a preferred embodiment the adjustment mechanism comprises a body having a first part received in the slot in the lockcup acting as a cam follower a second part received in a recess in the lock bar, the first part being rotatable within the slot and the second part being rotatable within the recess, the second part being arranged substantially parallel with and offset from the rotational axis of the first part. Rotation of the first part will cause the lock bar to move so that the tip of the lock bar moves towards and away from the ratchet wheel. Rotation of the first part can effect adjustment of the lock bar into the correct initial position. Movement of the lockcup cams the lock bar into the ratchet wheel locking position.

In another embodiment the adjustment mechanism comprises a body having a first part rotatable within the slot in the lockcup and a second part comprising a toothed pinion, the lock bar including a toothed rack formed therein, the toothed pinion being received within the toothed rack whereby rotation of the first part causes rotation of the toothed pinion so as to effect positional adjustment of the lock bar.

BRIEF DESCRIPTION OF THE DRAWINGS

Embodiments of the invention will now be described in detail by way of example and with reference to the accompanying drawings in which.

DETAILED DESCRIPTION OF THE INVENTION

A seat belt retractor in accordance with the invention has a spool (not shown) around which a belt (not shown) is wound mounted in a housing (not shown). The spool can be locked to prevent payout of the seat belt from the spool. The locking arrangement is shown in FIGS. 1 to 4.

Figure 1:
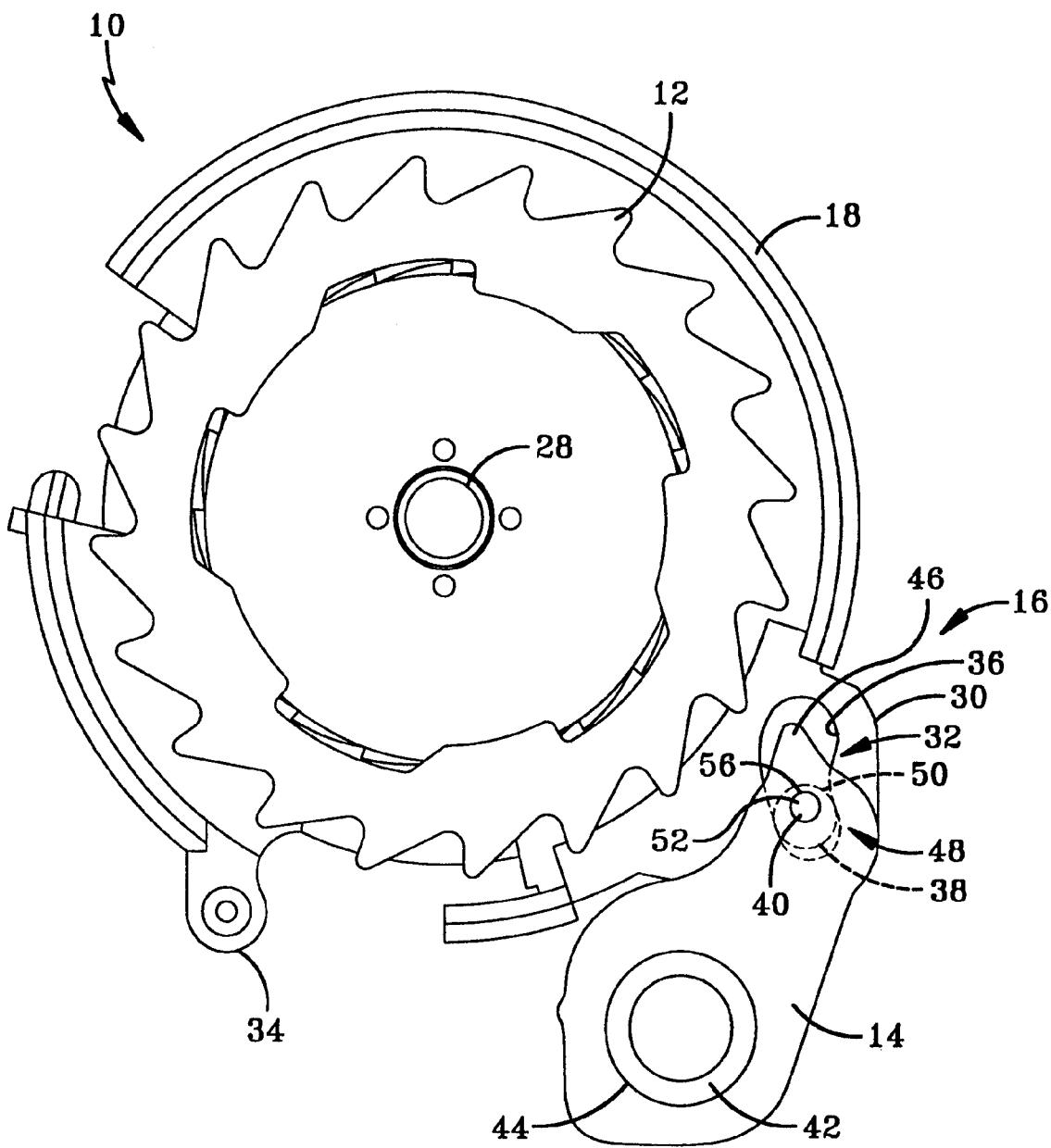
FIG. 1 is an elevation view of a locking mechanism of a seat belt retractor in accordance with the invention.
Figure 2:
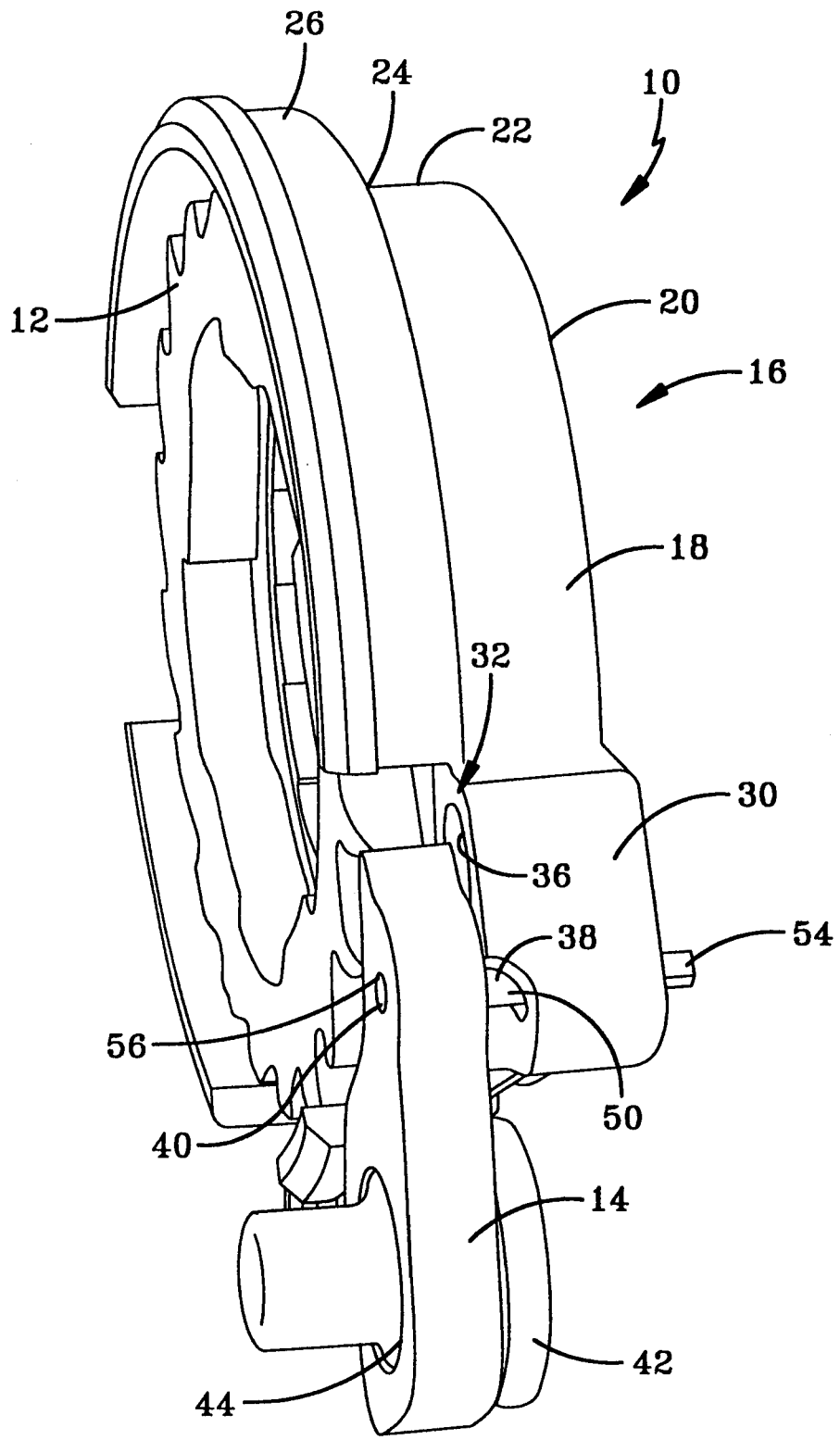
FIG. 2 is a perspective view of the locking mechanism shown in FIG. 1.
Figure 3:
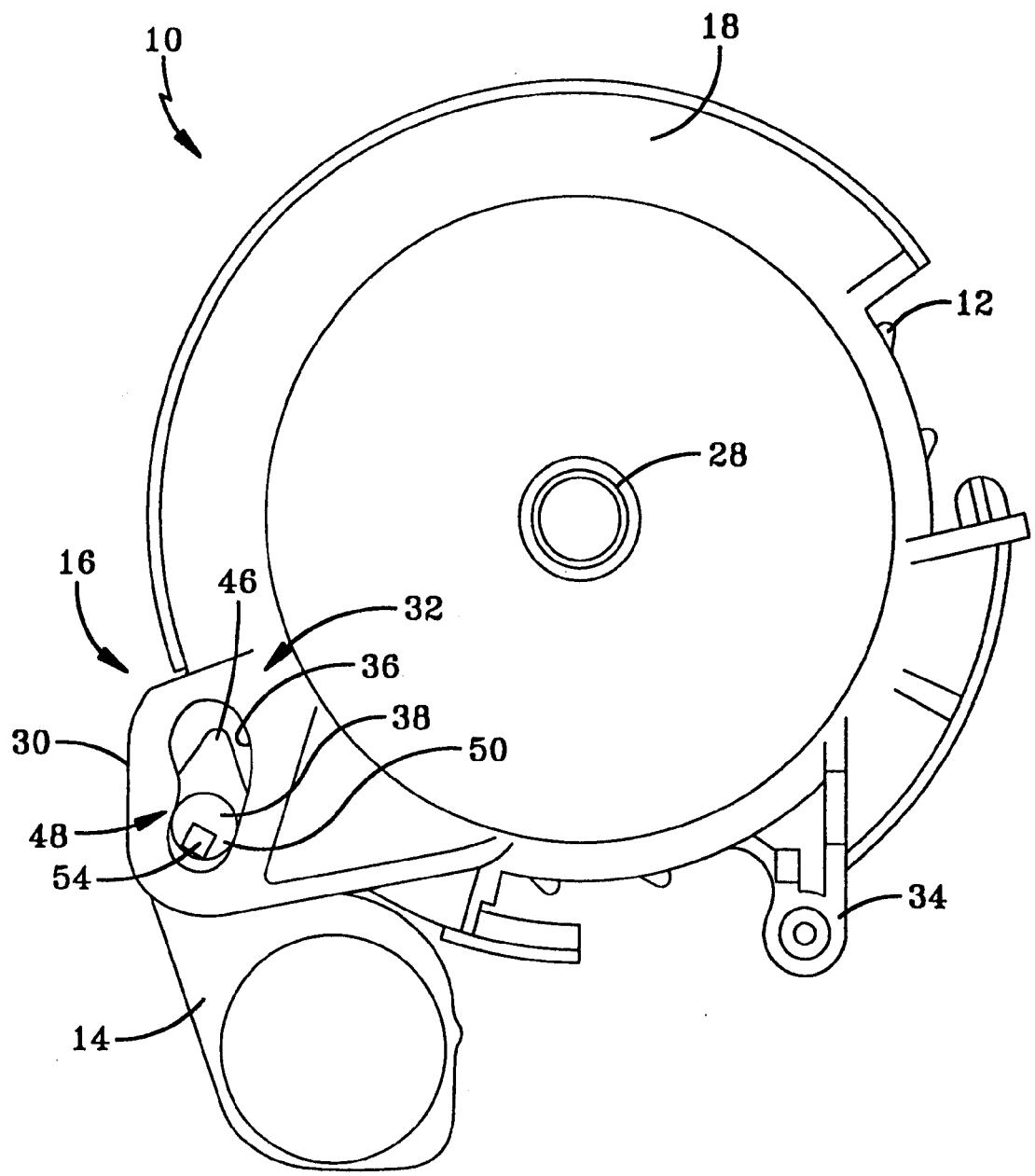
FIG. 3 is an elevation of the locking mechanism of FIGS. 1 and 2.
Figure 4:
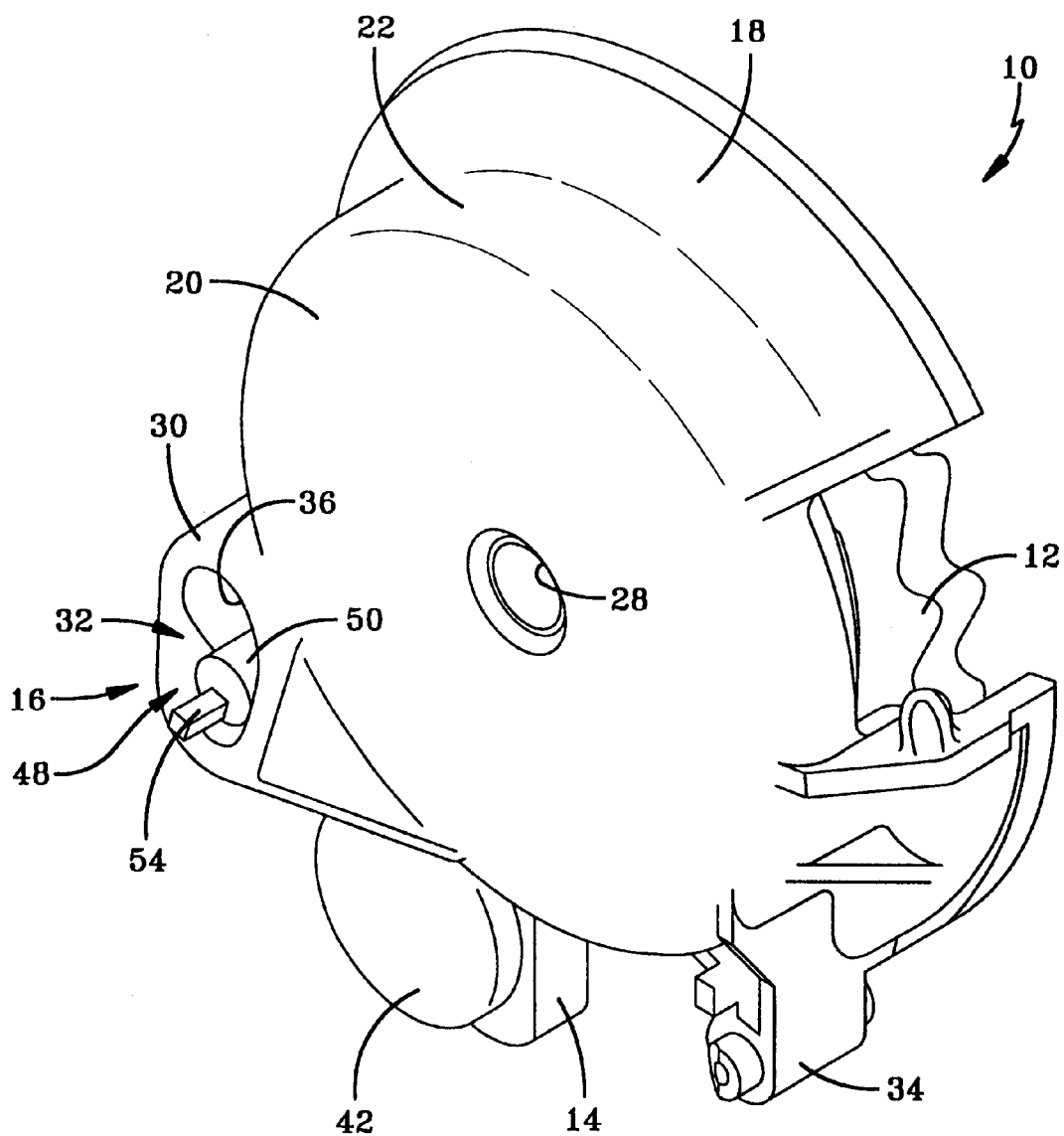
FIG. 4 is a perspective view of the locking mechanism shown in FIGS. 1 to 3 looking from the opposite side as that of FIG. 2.

In FIG. 1 the locking arrangement 10 comprises a toothed ratchet wheel 12 which is mounted to the spool (not shown), a lock bar 14 pivotally mounted to the housing of the retractor (not shown) and an assembly 16 for moving the lock bar into engagement with the ratchet wheel.

As stated above, the ratchet wheel is mounted on the spool (not shown) and the ratchet wheel 12 is received in a lockcup 18. The lockcup is in the form of a bowl having a substantially circular base 20 and a circular peripheral wall portion 22 which widens in diameter via a shoulder 24 into a wider diameter peripheral wall portion 26. The ratchet wheel 12 is received within the wider diameter peripheral wall portion 26. The lockcup 18 has an aperture 28 formed therein centrally of the base 20 which is designed to receive a shaft (not shown) extending from the housing (not shown). The lockcup is designed to rotate about the shaft.

The lockcup 18 further comprises a projecting part 30 which carries the assembly 16 for moving the lock bar 14. The assembly 16 comprises a camming arrangement 32 for moving the lock bar 14 from an initial position to a position in engagement with the ratchet wheel 12.

The lockcup 18 also comprises a depending part 34 which is designed to carry a locking sensor, for example a locking sensor of the type shown in commonly owned U.S. patent application Ser. No. 09/373,422, now U.S. Pat. No. 6,230,997.

The camming arrangement 32 comprises a kidney shaped slot 36 formed in the projecting part 30. The longitudinal axis of the slot 36 extends substantially tangentially of the ratchet wheel 12 so that movement along the slot is movement towards and away from the ratchet wheel. A cam follower 38 is located in the slot and is pivotally connected at the pivot point 40 to the lock bar 14.

The lock bar 14 is pivotally mounted to the housing (not shown) by means of a pivot pin 42 that extends through an aperture 44 in the lock bar and is connected to the housing. The lock bar comprises a tip 46 that can engage the teeth of the ratchet wheel 12.

In the event of a crash the locking sensor mounted to the depending part 34 engages the ratchet wheel 12 to lock the lockcup 18 to the ratchet wheel. As the seat belt begins to pay out under the momentum of the vehicle occupant moving forward in the vehicle the ratchet wheel 12 causes the lockcup 18 to rotate which moves the slot 36 relative to the cam follower 38. As the cam follower moves along the slot the tip of the lock bar 14 is moved toward the ratchet wheel 12 until the tip engages between teeth of the ratchet wheel. That locks the ratchet wheel and prevents further rotation of the spool.

The initial position of the tip of the lock bar 14 relative to the teeth of the ratchet wheel 12 is important because that distance determines the time between locking of the lockcup 18 to the ratchet wheel and the engagement of the tip 46 of the lock bar 14 with the teeth of the ratchet wheel. As mentioned above, the selection of the distance is critical since incorrect location of the tip can result on the one hand in overly frequent engagement of the lock bar with the ratchet wheel and thus locking the retractor or on the other hand an overly delayed engagement of the lock bar with the ratchet. Previously to solve that problem very tightly toleranced parts have been used so as to avoid the problem of dimension errors creating the accuracy in the initial position of the lock bar.

According to the present invention adjustment is provided so that less tightly toleranced parts can be used and thus the cost of the assembly reduced. The adjustment mechanism 48 in the retractor of FIGS. 1 to 4 comprises the specific arrangement of the cam follower 38. The adjustment mechanism 48 comprises the cam follower 38 which has a main cam follower body 50 with a lock bar coupling projection 52 projecting from one end thereof and an adjustment handle 54 projecting from the other end thereof. The cam follower body part 50 is located within the slot 36 so as to be able rotate about a longitudinal axis of the cam follower 38. The lock bar coupling projection 52 of the cam follower extends from the end of the cam follower body 50 into a bore 56 in the lock bar 14 so as to define the pivot point 40. The lock bar coupling projection 52 is positioned offset from the axis of rotation of the cam follower body part 50. The handle 54 extends from the other end of the cam follower part 50 and is arranged substantially parallel with but offset from the axis of the follower 38. By turning the handle and rotating the cam follower body part, the lock bar coupling projection 52 moves in a circular path and the lock bar tip 46 can be moved from side to side, towards and away from the ratchet wheel 12. Although the side to side movement of the lock bar is only over a small distance, the adjustment is sufficient for the purposes of correct alignment of the initial position of the lock bar.

Figure 5:
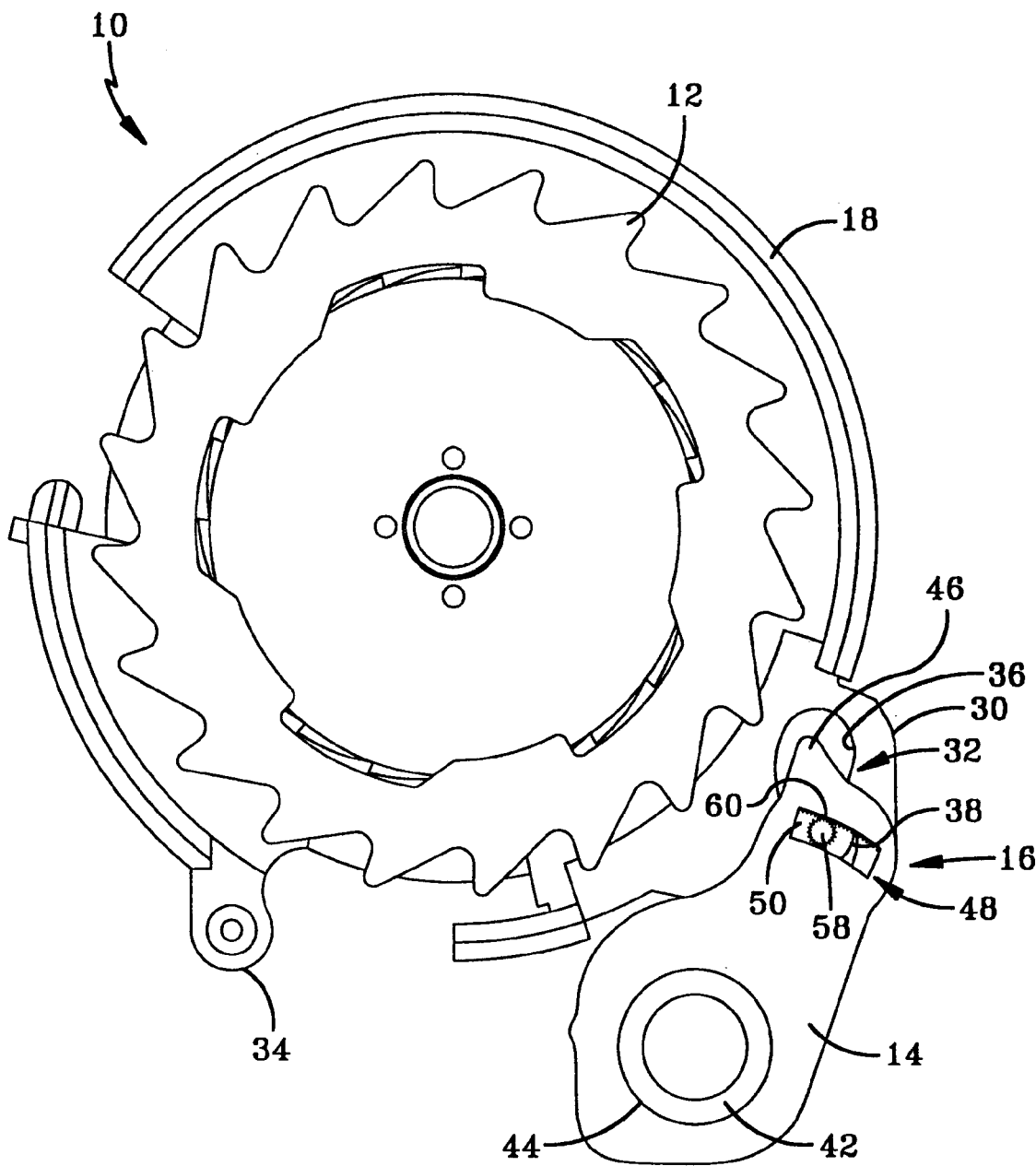
FIG. 5 is an elevation of a locking mechanism of another retractor in accordance with the invention.
Figure 6:
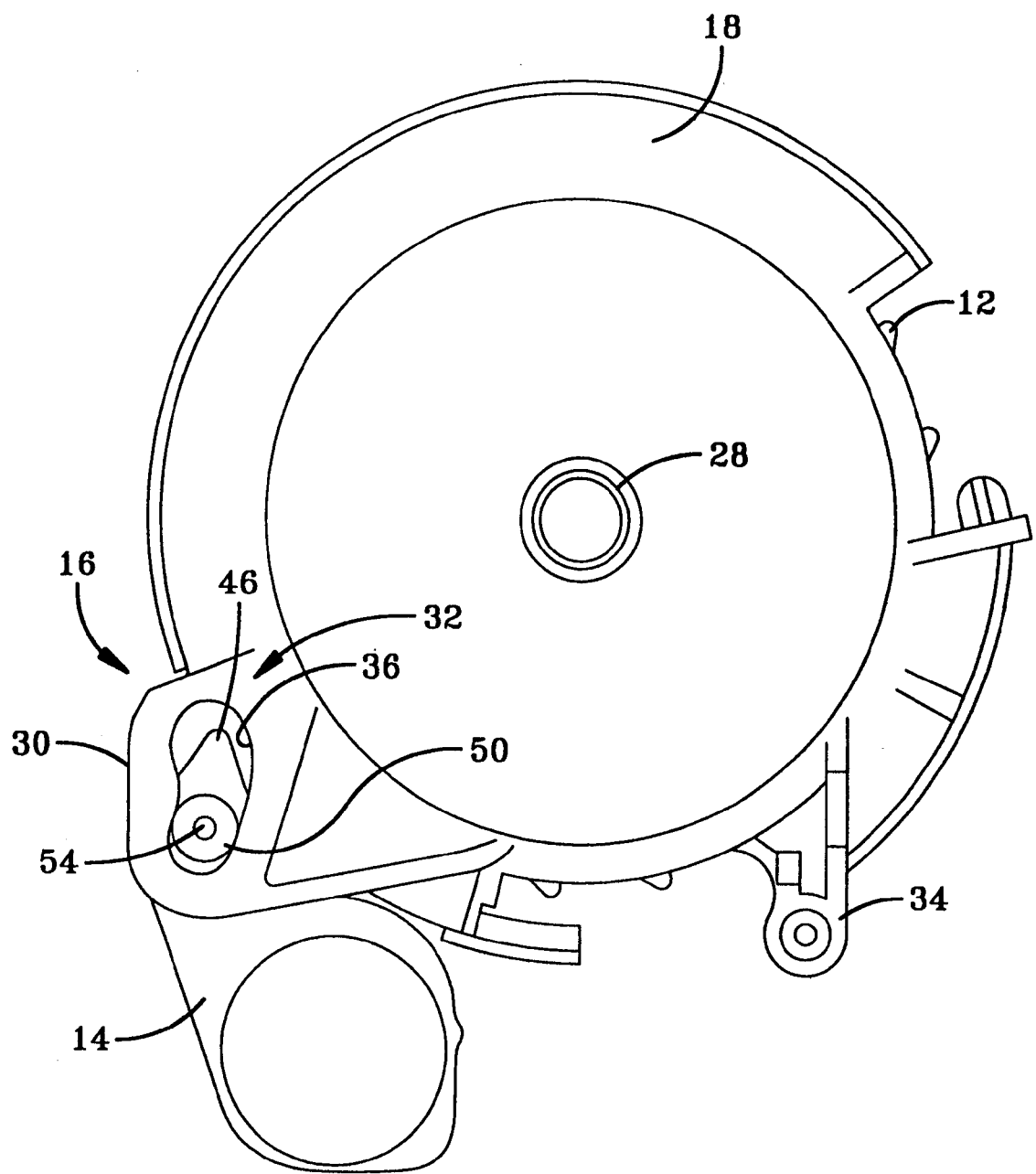
FIG. 6 is an elevation of the retractor of FIG. 5 looking from the other side of the locking mechanism.
Figure 7:
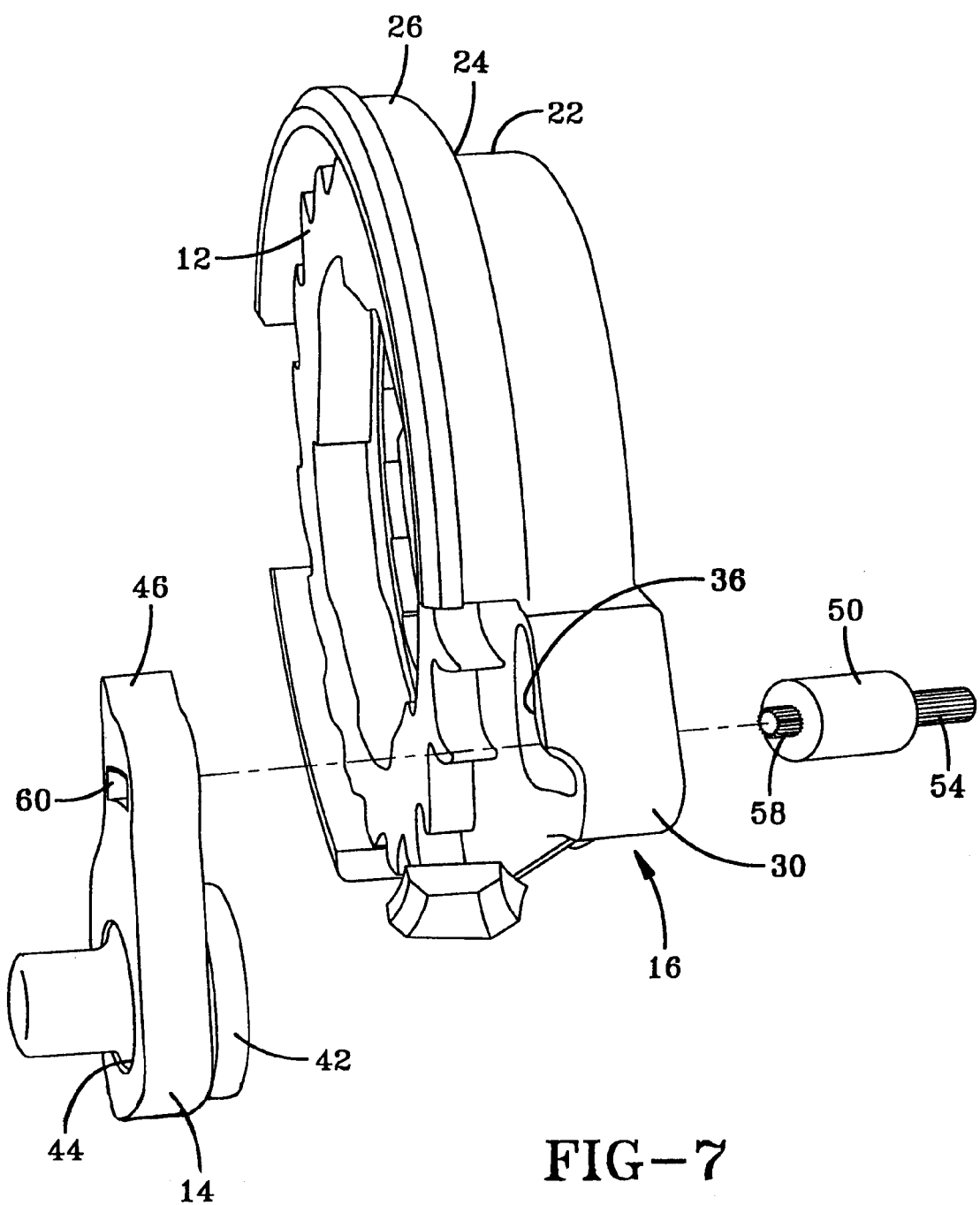
FIG. 7 is an exploded perspective view of the retractor of FIGS. 5 and 6.

FIGS. 5 to 7 show an alternative locking arrangement for a seat belt retractor. Parts corresponding to parts in FIGS. 1 to 4 carry the same reference numerals.

The locking arrangement 10 shown in FIGS. 5 to 7 is substantially identical to that of FIGS. 1 to 4 except the adjustment mechanism 48 for adjusting the initial position of the tip 46 of the lock bar 14 is different.

The adjustment mechanism 48 shown in FIGS. 5 to 7 is formed by the cam follower member 38. The cam follower member comprises a main cam follower body part 50 with a handle 54 extending from one end thereof and axially thereof. The handle has a knurled peripheral surface to facilitate turning of the handle by a user. A toothed pinion 58 extends from the other end of the main cam follower part 50 as shown in FIGS. 5 and 7. The pinion 58 is received in a toothed slot 60 formed in the lock bar 14. The toothed slot 60 extends substantially radially of the ratchet wheel 12. Movement of the handle 54 rotates the toothed pinion 58 within the toothed slot 60. Since the pinion 58 is constrained against lateral movement by the location of the cam follower body part 50 in the slot 36 the lock bar 14 is forced to move towards or away from the ratchet wheel 12 depending upon the direction of rotation of the pinion.

As with the locking arrangement of FIGS. 1 to 4 rotation of the lockcup 18 relative to the lock bar 14 forces the tip 46 of the lock bar into engagement with teeth of the ratchet wheel 12.

As mentioned above, the position of adjustment mechanism 48 allows less tightly toleranced parts to be used in the manufacture of the locking arrangement 10 and for the ideal position of the tip 46 of the lock bar 14 relative to the teeth of the ratchet wheel 12 to be chosen after assembly.

Preferably, the position of the lock bar 14 can be sensed by an appropriate sensor, for example an optical sensor and the position of the tip adjusted accordingly. Such an arrangement allows the adjustment to be automated.

The foregoing discussion discloses and describes exemplary embodiments of the present invention. One skilled in the art will readily recognize from such discussion, and from the accompanying drawings and claims, that various changes, modifications and variations may be made therein without departing from the spirit and scope of the invention as defined in the following claims.

We claim:

1. A seat belt retractor comprising:

a retractor housing, a spool in the housing, a ratchet wheel coupled to the spool, a locking assembly for locking the ratchet wheel to the retractor housing, said locking assembly comprising a lock bar pivotally mounted to the retractor, the lock bar moveable from an initial position to a ratchet wheel locking position whereby the lock bar engages the ratchet wheel to lock the ratchet wheel to the retractor housing and a lockcup mounted to said retractor housing having a slot, wherein the lock bar has a toothed slot extending substantially radially to the ratchet wheel; and a cam follower comprising a toothed pinion extending from one end of the cam follower and a handle extending from an other end of the cam follower, the slot of the lockcup partially receives the cam follower for engagement therewith wherein the toothed pinion extends from the slot into engagement with the toothed slot and the handle extends from the slot in an opposite direction as the toothed pinion, whereby rotation of the handle of the cam follower adjusts the distance between the lock bar and the ratchet wheel by rotating the toothed pinion within the toothed slot.

2. The seat belt retractor according to claim 1 wherein the lock bar has a tip extending from a top portion of the lock bar whereby the cam follower adjusts the distance between the tip of the lock bar and the ratchet wheel.

3. The seat belt retractor according to claim 1 wherein the cam follower has a body part disposed between the handle and the toothed pinion, wherein the body part has a uniform diameter, the diameter of the body part is greater than the diameter of the handle and the diameter of the toothed pinion.

4. The seat belt retractor according to claim 3 wherein the body part of the cam follower rests within the slot of the lockcup.

5. The seat belt retractor according to claim 1 wherein teeth from the toothed pinion engage with teeth from the toothed slot of the lock bar.

* * * * *